Aug. 7, 1928.
O. WIEDERHOLD
LIGHT FOR SHAVING AND THE LIKE
Filed Feb. 16, 1927
1,680,076
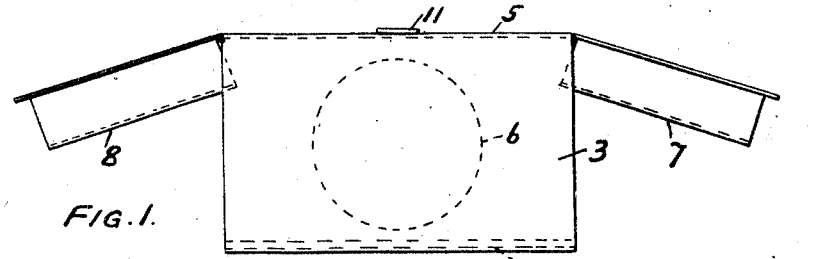
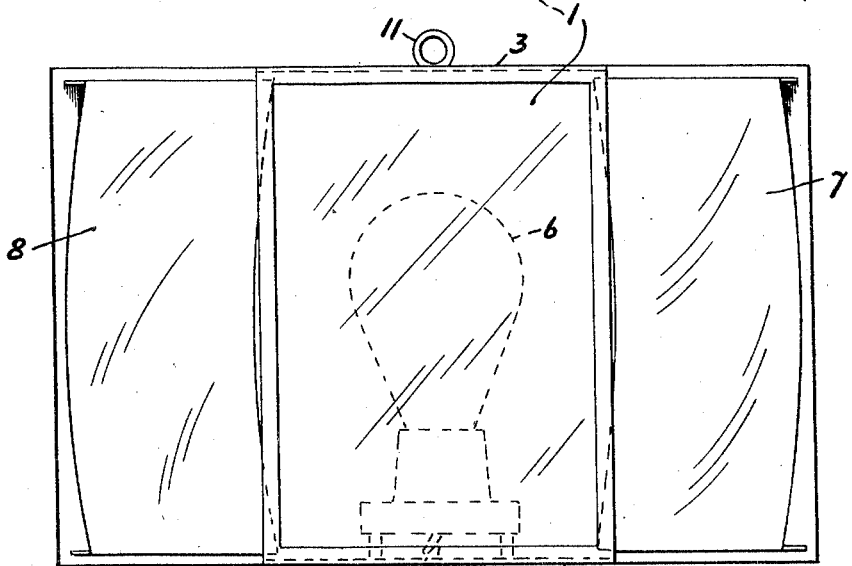
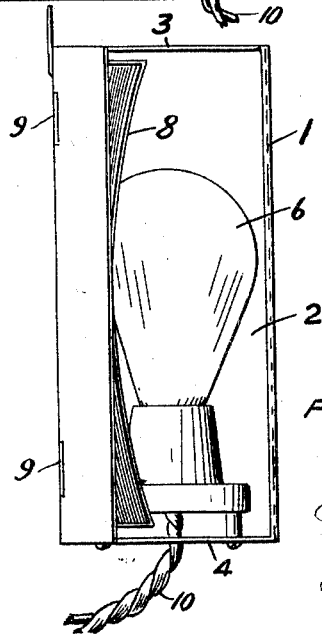

Patented Aug. 7, 1928.

1,680,076

UNITED STATES PATENT OFFICE.

OSCAR WIEDERHOLD, OF PHILADELPHIA, PENNSYLVANIA.

LIGHT FOR SHAVING AND THE LIKE.

Application filed February 16, 1927. Serial No. 168,503.

The principal object of the present invention is to provide a morror light having means for illuminating the object reflected in it which shall be of a character that especially adapts it for shaving and which shall be comparatively inexpensive to make and satisfactory in use.

Other objects of the invention will appear from the following description and the invention, generally stated, may be said to comprise a mirror having in rear thereof a receptacle open at each side of the mirror and having an electric lamp arranged in the receptacle and concealed by the mirror and having movable curvilinear reflectors arranged at both sides of the mirror and back of the open sides of the receptacle.

The invention also comprises the improvements to be presently described and finally claimed.

In the following description reference will be made to the accompanying drawing forming part hereof and in which Figure 1 is a top or plan view.

Fig. 2 is a front view, and

Fig. 3 is an end view.

In the drawing 1 is a mirror having in rear thereof a receptacle 2 open at each side throughout its height and shown as provided with top and bottom walls 3 and 4 and with a back wall 5. 6 is an electric lamp arranged in the receptacle and concealed by the mirror. 7 and 8 are curvilinear reflectors arranged at both sides of the mirror and back of the open sides of the receptacle. As shown the curvilinear reflectors 7 and 8 are hinged to the back wall 5 as at 9. The conductors 10 for the lamp circuit are shown as arranged through the bottom of the receptacle and the back wall of the receptacle is shown as provided with a suspension eye 11.

The device is no higher than the mirror and it is therefore compact and presents an attractive appearance. In fact when the reflectors are arranged to close the openings at the sides, the device presents the appearance of an ordinary mirror. However, when the reflectors are turned into open position substantially as shown in the drawing and the lamp is lighted, the face of the one looking into the mirror is so well illuminated that the image in the glass is clear and sharply defined while at the same time there is no glare in the eyes nor is the lamp visible. Any heating effect of the lamp is negligible because the openings at the sides of the mirror afford ample ventilation.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A light for shaving and the like comprising a receptacle of which the front consists of a mirror and which is open at the sides, a lamp in the receptacle behind the mirror, and movable reflectors arranged to project outwardly at each of the side edges of the mirror and back of the lamp and adapted to reflect light forwardly from opposite sides of the mirror.

2. A light for shaving and the like comprising a receptacle having a top wall and a bottom wall and a back wall and a front wall equipped with a mirror providing openings at the sides, a lamp in the receptacle behind the mirror, and reflectors hinged to the back wall and adapted to provide side walls for the receptacle and to project outwardly from the side edges of the back wall.

OSCAR WIEDERHOLD.